United States Patent [19]

Ficker

[11] Patent Number: 4,665,101
[45] Date of Patent: May 12, 1987

[54] METHOD FOR THE CONTINUOUS, DRY, NON-PRESSURIZED REGENERATION OF SALVAGED RUBBER

[75] Inventor: Stefan Ficker, Munich, Fed. Rep. of Germany

[73] Assignee: Ingenieurbüro S. Ficker, Munich, Fed. Rep. of Germany

[21] Appl. No.: 709,038

[22] Filed: Mar. 7, 1985

[30] Foreign Application Priority Data

Mar. 8, 1984 [DE] Fed. Rep. of Germany ....... 3408493

[51] Int. Cl.$^4$ .................. C08J 11/04; C08L 21/00; C08C 19/08
[52] U.S. Cl. .................................. 521/41; 264/26; 264/DIG. 69; 425/174.4; 425/174.8 R; 521/45.5; 528/503
[58] Field of Search ............ 264/25, 26, 27, DIG. 69, 264/DIG. 65, DIG. 45, DIG. 46; 425/174.4, 174.8 R; 528/503, 481; 521/41, 45.5

[56] References Cited

U.S. PATENT DOCUMENTS

| | | | |
|---|---|---|---|
| 2,353,362 | 7/1944 | Rudd | 264/DIG. 65 X |
| 3,145,088 | 8/1964 | McKay | 264/347 |
| 3,850,875 | 11/1974 | Robson | 264/DIG. 65 X |
| 3,873,474 | 3/1975 | Ficker | 521/45.5 |
| 4,242,220 | 12/1980 | Sato | 264/DIG. 69 X |
| 4,469,817 | 9/1984 | Hayashi et al. | 521/45.5 X |

FOREIGN PATENT DOCUMENTS 0022479 2/1979 Japan .......................... 264/DIG. 69

OTHER PUBLICATIONS

The Miami Herald, Thursday, May 17, 1979, "Goodyear Develops 'Instant' Rubber".

Primary Examiner—Jan H. Silbaugh
Assistant Examiner—Harold Y. Pyon
Attorney, Agent, or Firm—Karl F. Ross; Herbert Dubno

[57] ABSTRACT

Comminuted salvaged rubber is heated to the reclaiming temperature in a two-stage process such that part of the overall heat required is introduced by microwave heating and the remainder by convectional heating. Material preheated during the first stage is transferred to the second stage in such a way that the relative position of all the particles is maintained with as little change as possible. Since the temperature profile of microwave heating shows a maximum in the interior and a minimum at the periphery, whereas that of convectional heating is just the reverse, the temperature distribution within the material can be evened out to a great extent by combining these two different methods of heating. Since it is no longer necessary in this case to heat the material to such an extent convectionally, it is possible to avoid caking and the formation of deposits, and thus to considerably improve the quality of the reclaimed rubber.

3 Claims, 7 Drawing Figures

DISTANCE FROM HEATING SURFACE

EDGE — MIDDLE — EDGE

METHOD FOR THE CONTINUOUS, DRY, NON-PRESSURIZED REGENERATION OF SALVAGED RUBBER

BACKGROUND OF THE INVENTION

The present invention relates to a further improvement in the non-pressurized, dry and continuous method—using hollow-flight screw apparatuses—for regenerating salvaged rubber and to means for the implementation thereof, which means, under full adherence to the known advantages of said method, especially is ecological benefits, make possible a considerable improvement in the quality of the reclaimed rubber while, at the same time, guaranteeing an increased throughput for a given heat exchange surface, in other words, also for a given apparatus.

The invention employs the known basic principle referred to above of first depolymerizing the salvaged rubber, the same—as far as "reinforced" rubber is concerned—having been freed of any fabric plies and/or steel wire inserts and reduced to a suitable particle size of 1 to 5 mm, by heating in the presence of softeners and reclaiming agents such as NAFTOLEN and RENACIT and then subjecting it to rapid cooling. In the following the term "salvaged rubber" shall refer both to synthetic rubbers such as BUNA and the like as well as to used natural rubber or caoutchouc, which are also obtained in the form of discarded vehicle tires.

It is common knowledge that the regeneration cannot be initiated beneath a critical threshold temperature which, depending on the nature of the salvaged rubber, varies approximately between 150° and 180° C., and that if either the optimal reclaiming temperature or the optimal retention time at this or even higher temperatures is exceeded, "over-regeneration", with the accompanying severe reduction in quality, is the rsult. Furthermore, the reduced quality of the reclaimed rubber, which in all known cases is clearly inferior to that of new rubber, is attributable not least to the fact that always, in all known methods, not only the individual salvaged rubber particles but also the different zones of each particle are exposed to different temperatures for different lengths of time, with the result that over- and-/or under-regeneration of a considerable proportion of the starting material has hitherto been inevitable.

In practice, for the regeneration of rubber, use is made today almost exclusively of the autoclave process. This process involves treating the salvaged rubber under pressure and heat with chemicals. This process, however, due not only to difficulty of operation and inefficiency but in particular to the considerable environmental pollution, is of no significance in developed countries. In addition to this, all the disadvantages of an extremely lengthy (5–12 h) discontinuous procedure are inherent in the method.

The only dry regeneration process, even if applied only to a very limited extent, is the extrusion process, during which the heat required for the regeneration is introduced into the salvaged rubber by way of convection and the simultaneous application of high pressure. Due to high installation and operating costs as well as to the poor quality of the reclaimed rubber, this process is virtually obsolete.

BRIEF DESCRIPTION OF THE DRAWINGS

The objects, features and advantages of this invention will become more readily apparent from the following description, reference being made to the accompanying drawings in which.

SUMMARY OF THE INVENTION

Figure 1:
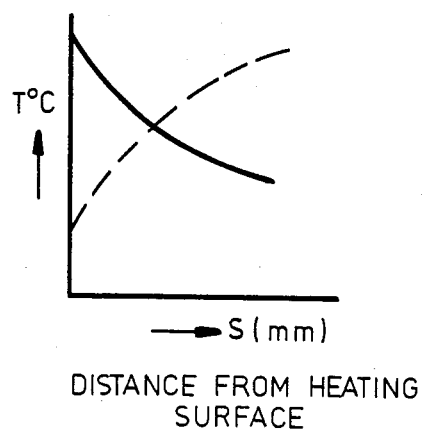
FIG. 1, represents the temperature profile in the bulk of comminuted salvaged rubber.
Figure 2:
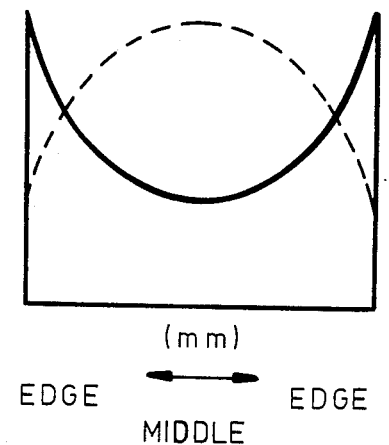
FIG. 2, represents the temperature profile within the individual grains comprising the bulk rubber.

According to the present invention the temperature distribution during the regeneration process is rendered much more uniform with respect both to the bulk material from grain to grain and also to the interior of the individual grains themselves, with the result that a considerable improvement in the quality of the reclaimed rubber is possible since the thermal energy required for heating up the material is introduced into the same only in part by per se known way of convection, the remainder being introduced by way of heating with microwaves. In the Federal Republic of Germany there is a standard frequency, namely 2450±50 MHz, for this purpose. The invention thus makes use of the fact that the spatial temperature distribution using this type of heating assumes precisely the opposite course to that characteristic of convectional heating. Whereas the temperature distribution in the case of convectional heating is represented by the solid lines in FIGS. 1 and 2, it is represented in the case of microwave heating by the dashed lines; FIG. 1 represents the temperature profile in the bulk material, and FIG. 2 the temperature profile within the individual grain.

By appropriately superimposing these two opposing temperature profiles it is possible according to the invention to equalize to a large extent the temperature variation both in the bulk material and within the individual grains themselves, something which is not possible according to any of the known methods.

It is furthermore important according to the invention that on completion of the regeneration, the material is immediately and rapidly cooled—using forced cooling means, preferably a cooling drum—beneath the reclaiming temperature, best of all to a temperature below 80° C. The use of high-frequency heating for regenerating caoutchouc was in fact proposed in the FR-PS No. 911 385 and in CH-PS No. 245 370, but not, contrary to the invention, in conjunction with simultaneous convectional heating; this meant that in these processes it was equally impossible to even out the temperature distribution as in the case of the known method employing convectional heating, and this disadvantage is clearly conceded in the second of the two patent specifications referred to.

By combining the two different methods of heating according to the invention the temperature differences, which are usually more than 100° C. (temperature differences of over 140° C. have sometimes been recorded) and occur both in the known methods employing convectional heating and in those employing microwave heating, between the different parts of the material under treatment can be reduced to as little as 15°–20° C. if the course of the process is carefully supervised.

For the combined heating of the rubber it is expedient not to employ the two different methods of heating at the same time but successively, in two different apparatuses. It is preferable to apply microwave heating during the first and convectional heating during the second stage.

The advantage offered by this preferred sequence consists primarily in that the temperature of the heating means and thus also of the reclaiming screw can be kept lower—in practice about 20°–50° C.—at the convectional heating stage than would be the case with the reverse sequence. The avoidance of caking thus made possible offers the further advantage of being able to employ a single-screw apparatus instead of the self-cleaning double-screw apparatus with intermeshing helices, that was hitherto indispensable for the convectional heating of salvaged rubber. Use of a single-screw apparatus in turn offers a series of further advantages. It is expedient in this case to coat the screw surface as well as the interior wall of the cylindrical casing with polymers of fluoridated, fully halogenated olefins exhibiting good anti-adhesion properties and incorporating strength-increasing mineral additives that exhibit a sufficient degree of hardness up to 250° C.

A striking advantage of the single-screw apparatus compared to the double-screw type is the ease of manufacture—due to the simplified geometry—of screw and circular trough. A further advantage is the reduction in dead spaces and the resulting increase in filling ratio, as well as the more uniform retention time for all the particles. With this preferred embodiment of the invention it becomes possible for the first time to completely eliminate caking; as a result not only the quality of the reclaimed rubber is improved but also the heat transfer and thus—referred to the heat exchange surface—an increased throughput made possible.

Figure 3:
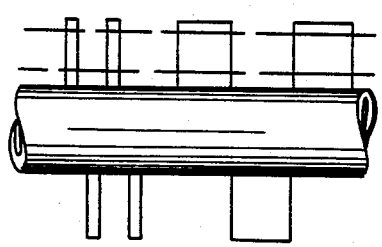
FIG. 3, illustrates a single-screw apparatus having rectangular screw blades.
Figure 4:
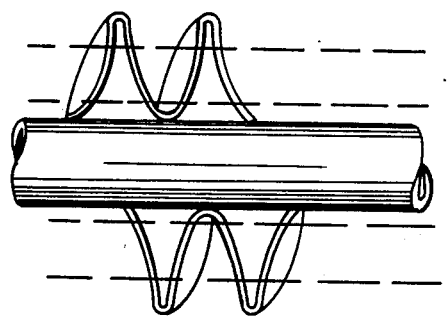
FIG. 4 illustrates a single-screw apparatus having curved screw blades.

Although all these advantages are themselves exemplary, there is yet another advantage which is of great importance for the purpose of the present invention. Namely, with a single-screw apparatus it is possible to use screw blades of rectangular or preferably square cross-section (cf. FIG. 3) instead of screw blades of curved cross-section (cf. FIG. 4), which are indispensable for intermeshing double screws. This means that the material being treated, whatever the distance from the axis, is bound to have the same layer thickness—measured from screw flank to screw flank—(cf. dotted lines FIGS. 3 and 4) and thus, when heated, will exhibit to a large extent the same average temperature. In contrast to this the blades of the double screw apparatuses, which alone could be used hitherto for the dry regeneration of rubber, introduced at different distances from the screw axis the same amount of heat into quantities of material that varied in size, with the result that these were heated to varying degrees.

According to the preferred embodiment of the invention, in which high-frequency heating is applied during the first procedural stage, the rubber being treated is heated during this stage (HF-heating) until the material in the interior zone of the HF heating canal reaches the reclaiming temperature of one just below. The thus heated material is then, if necessary after a suitably selected intermediate retention time, fed to the reclaiming screw, which is preferably designed as a hollow-flight screw heat exchanger, in which the material of the outer zone is heated further until it too reaches the reclaiming temperature of—depending on the type of material to be reclaimed—180° to 240° C., thus being depolymerized.

For the procedural stage involving microwave heating a simple conveyor belt is suitable, preferably made of material such as plastic which is transparent to microwaves, and having a high-frequency radiation source disposed above and if necessary also below said conveyor belt, or else a vertical shaft having suitable damping elements at the upper and lower ends thereof to prevent microwave rays from emerging. It is at all costs essential that the transfer from the first to the second procedural stage ensues such that the position of all the particles relative to each other is maintained with as little change as possible; in this way one achieves the most effective opposite effect with regard to the temperature distribution resulting from the first procedural stage. For this reason the internal crosssections of the microwave canal and the heating screw should correspond with each other as far as possible, with regard both to the absolute size and to the geometrical shape.

SPECIFIC DESCRIPTION

Figure 5:
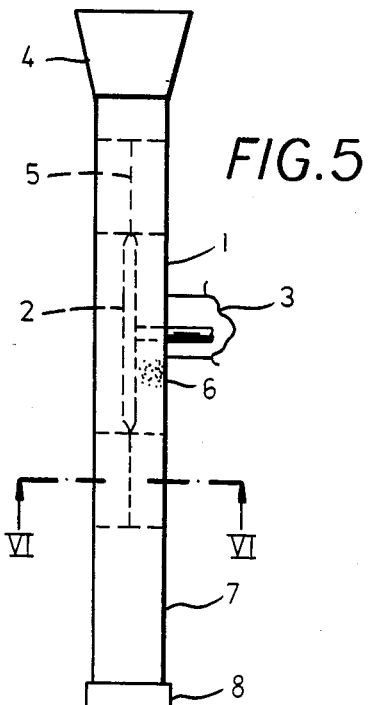
FIG. 5 is a vertical section through a canal intended for the microwave heating stage.
Figure 6:
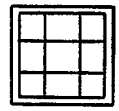
FIG. 6 is a horizontal section along line VI—VI of FIG. 5.
Figure 7:
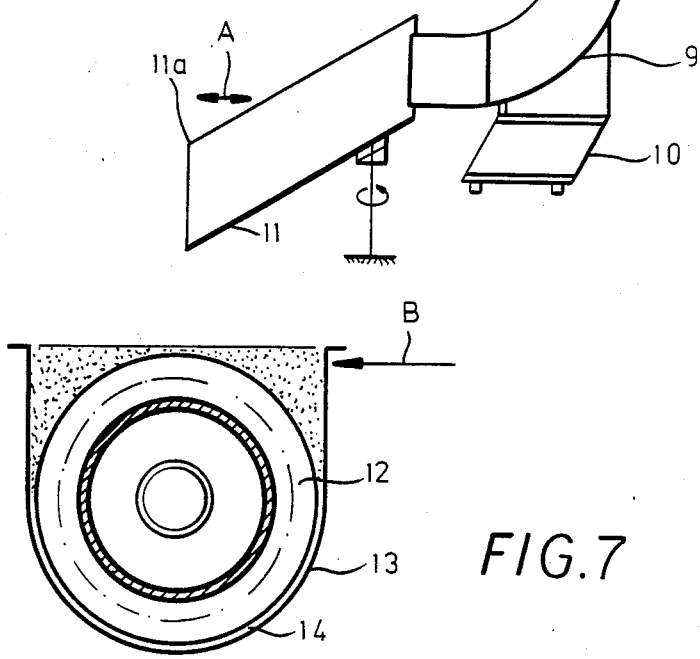
FIG. 7 is a vertical section through the part of the apparatus intended for the convectional heating stage.

A preferred embodiment of the invention will now be described in more detail with reference to FIGS. 5 to 7.

In the figures reference numeral 1 denotes the microwave heating canal, 2 the brush-discharge electrode emitting the microwaves, 3 the magnetron supplying the electrode 2. Numeral 4 is the charging funnel, 5 the damping elements which prevent the microwaves from emerging from the canal 1, 6 the rubber particles, and 7 an intermediate canal in which the material coming from the first procedural stage can be retained for a given time without being heated further. The length of intermediate canal 7, and thus the length of time the material is retained there, is preferably adjustable. The intermediate canal 7 is connected via a flexible connecting piece 8 and the curved element 9 with the vibrating conveyor trough 10, by way of which the material issuing from the zone 7 is fed, without disturbing its layering and at a throughput speed that can be accurately regulated, to the charging trough 11; in this way it is possible to simultaneously regulate the retention time in the microwave canal 1 and thus the degree to which the material is heated here.

The charging trough 11 in turn feeds the material to the hollow-flight heat exchanger serving as reclaiming screw 12 and supplied with heating liquid. The material is fed into the centre of the first screw flight, the charging trough 11 following this at the same axial speed—so that the material is always fed into the centre of the screw flight—until the first screw flight comes to an end. Trough 11 then returns rapidly to the starting position, and the process is repeated continuously. The charging end 11a of charging trough 11 can also be slid to and fro and adjusted accordingly, as shown by arrow A, so as to ensure that the charge material is always supplied to the reclaiming screw in such a way that it falls away uniformly on both sides of the screw flight, and that trough 13 fills uniformly, cf. arrow B.

I claim:

1. Method for the continuous, dry, non-pressurized regeneration of salvaged rubber and/or plastic products by comminuting the products into a particulate material and heating the comminuted material, the latter having been freed of intermediate metal and/or fabric plies, to the reclaiming temperature, preferably in the range from 180° to 240° C., and then subjecting the regenerated material immediately to rapid forced cooling, characterized in that the heating occurs in a two stage manner and that part of the thermal energy required for heating to the reclaiming temperature is introduced by way of microwave energy into the material under treatment and the remainder by way of convectional heating, and the material heated during the first stage is continously transferred to the second stage in such a manner that the position of all the particles relative to one another remains to a large extent unchanged.

2. Method according to claim 1, characterized in that the convectional heating ensues by way of a hollow-flight screw heat exchanger.

3. Method according to claim 1, characterized in that the microwave heating is applied during the first stage.

* * * * *